United States Patent [19]
Ham

[11] 3,817,413
[45] June 18, 1974

[54] DEMOUNTABLE LOAD CARRYING BODIES

[76] Inventor: Rowland Herbert Ham, 10 Park Ln., Twyford, Berkshire, England

[22] Filed: Nov. 23, 1971

[21] Appl. No.: 201,365

Related U.S. Application Data

[63] Continuation-in-part of Ser. No. 875,839, abandoned.

[52] U.S. Cl. ............................. 214/515, 296/35 A
[51] Int. Cl. .............................................. B60p 1/64
[58] Field of Search... 214/515, 512, 38 BA, 38 BB; 296/35 A

[56] References Cited
UNITED STATES PATENTS
2,129,340   9/1938   Webber ............................ 214/515

FOREIGN PATENTS OR APPLICATIONS
194,942   3/1965   Sweden ............................ 214/515
1,430,488   11/1964   Germany ............................ 214/515
1,375,348   9/1964   France ............................ 214/515
1,516,879   2/1968   France ............................ 214/515

Primary Examiner—Albert J. Makay
Attorney, Agent, or Firm—Imirie and Smiley

[57] ABSTRACT

An attachment for a load carrying vehicle, or a load carrying vehicle incorporating the attachment, comprising longitudinal rails mountable one on each of two spaced longitudinal vehicle chassis members, and jacks to lift the rear portion of the rails off the chassis members, the jacks being fast with a fixed part of the chassis and operable to lift the rear of the rails off the chassis members when the vehicle has moved under the load supported on legs.

3 Claims, 5 Drawing Figures

DEMOUNTABLE LOAD CARRYING BODIES

CROSS-REFERENCE TO RELATED APPLICATION

This application is a continuation-in-part of Application Ser. No. 875,839 filed Nov. 12, 1969, now abandoned.

BACKGROUND OF THE INVENTION

In load carrying vehicles the body is provided with retractable legs and for mounting on a vehicle the body is stood on its extended front and rear legs at a height above the ground to enable the vehicle to be backed to bring its load carrying chassis beneath the body. The front legs are shorter than the rear legs so that while the back of the body is above the top of the chassis, the front is slightly lower than the back of the chassis: thus as the vehicle is backed, the front of the body rides up onto the chassis, usually with rollers on the body engaging the top of the chassis, and is rolled along the chassis until the chassis is fully beneath the body. This lifts the front body legs off the ground while the rear legs remain in engagement with the ground. When the body is supported above the chassis, jacks are operated first to raise the back of the body so that the rear legs lift off the ground and can be retracted and then the jacks lower the back of the body onto the chassis.

In known constructions of this kind the jacks on the chassis either engage the ground to raise the chassis and thus lift the back of the body, or the jacks engage the vehicle rear axle housing so that the rear vehicle springs flex upwardly to raise the chassis and the body back. Moreover, the hydraulically operated jacks are controlled from the driver's cab at the front of the vehicle so that the driver either has to be assisted by another operative or he has to carry out the operation alone from the cab which does not provide clear vision to the jacks. The chassis must be raised to lift the load before the rear legs are retracted and the body finally lowered onto the chasis. Control of the jacks from the cab remote from the back of the vehicle, therefore slows up the body mounting and demounting operation.

SUMMARY OF THE INVENTION

According to the present invention a load carrying vehicle is provided which is adapted to receive thereon a demountable body having legs disposable to support it above the ground and means to move over longitudinal members on the chassis, said vehicle comprising a chassis having front and rear wheel assemblies supporting springs carrying the chassis, a pair of laterally spaced longitudinal rails secured with respect to longitudinal chassis members and along which forward bearing members on the body may move, and a pair of jacks, fixed with respect to the chassis members independently of the springs, one on either side of the longitudinal axis of the vehicle and operable to engage and raise the rear portion of the body from the chassis members without reaction on the springs, whereby the legs may be disposed to support the body so that the vehicle may be moved in the direction of said axis to separate the vehicle and the body or vice versa.

In one preferred construction the jacks are double acting so that they are driven in both raising and lower operations. Preferably the jacks are hydraulically operated and a pump driven by a prime mover is mounted on the chassis adjacent to the jacks.

A transom preferably is provided on the rear road wheel assemblies and extending between spaced longitudinal chassis members and the jacks are secured to this transom adjacent to the chassis members. The rails may be secured one above each chassis member. Alternatively the jacks are mounted on cantilever brackets from each chassis member.

At the rear end portion of the chassis below the upper surfaces of the rails a centering element may be secured, the centering element having a rearwardly facing divergent slot or V-slot, the narrow forward end of which is centered on the longitudinal axis of the vehicle and shaped to receive a downwardly projecting spigot or cam element on the center of the rearward end portion of the body to center the rear portion of the body on the chassis.

It should be noticed that the centering element is particularly effective in performing its function of aligning the chassis when the latter has almost reached its final position under the body. The V-slot will cause the rear end of the vehicle chassis to move laterally for alignment, the vertical reaction loads on the rear wheels of the chassis being comparatively light in this position. The weight of the body is supported by small wheels bearing on the rails at the front end of the chassis and on the body rear support legs. The lighter reaction on the revolving rear wheels reduces their grip on the ground against lateral forces accordingly. This sideways movement normally is of the order of 4 inches either side of the longitudinal center-line of the vehicle.

The invention, from another aspect, comprises a vehicle of the invention and a load carrying body having retractable front and rear legs for mounting thereon.

According to a further aspect of the invention an attachment for securing to the load bearing portion of a load carrying vehicle, comprises a pair of rails securable in spaced lateral relation on the load bearing portion and a pair of power operated jacks carried by the chassis to raise and lower the rails with respect to the chassis, the upper surfaces of the rails being adapted to form tracks along the load bearing portion on which forward bearing members on a body may move to permit loading the body on and off the vehicle while its rear end is supported sufficiently high above the ground to permit the load bearing portion to be moved beneath the body. Alternatively the jacks act directly onto the rear portion of the body to raise it off the rails which are then fast on the chassis.

DETAILED DESCRIPTION OF THE INVENTION

Figure 1:
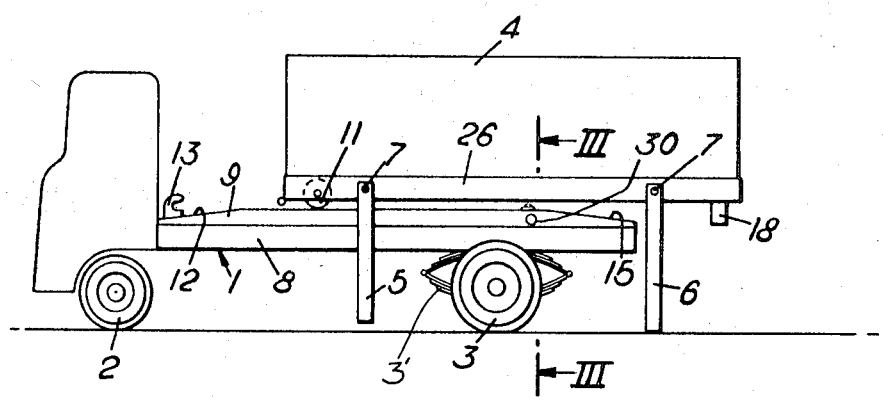
FIG. 1 is a side view showing diagrammatically a load carrying vehicle with a loaded body partly mounted thereon.
Figure 2:
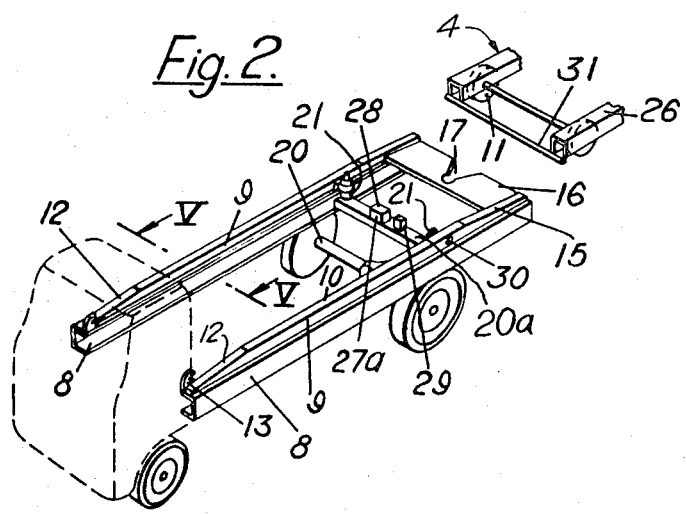
FIG. 2 is a perspective view of the vehicle of FIG. 1 showing the general layout of the body mounting attachment secured thereto.
Figure 3:
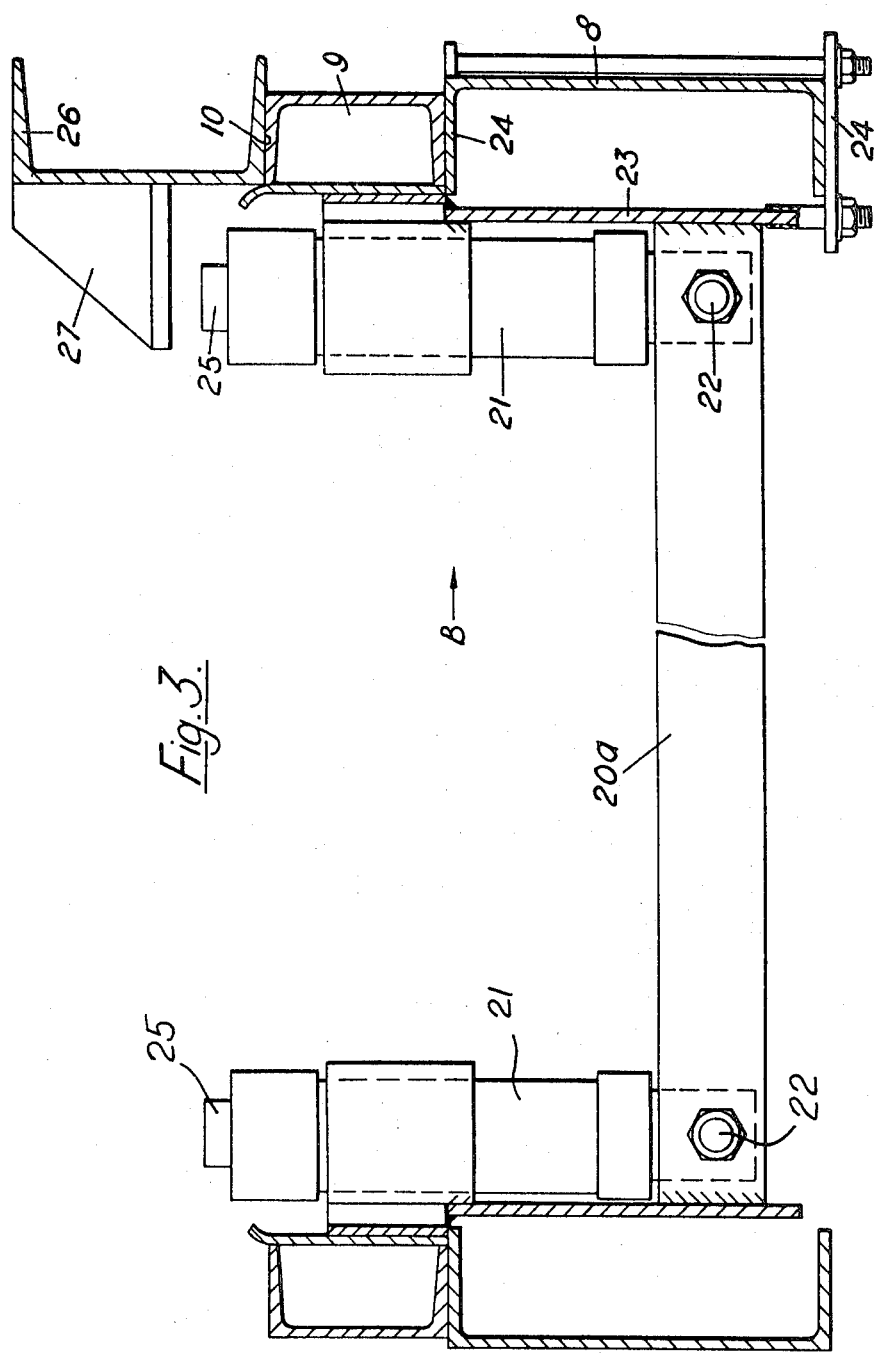
FIG. 3 is a cross-section along the line III—III of FIG. 1 looking in the direction of the arrows.
Figure 4:
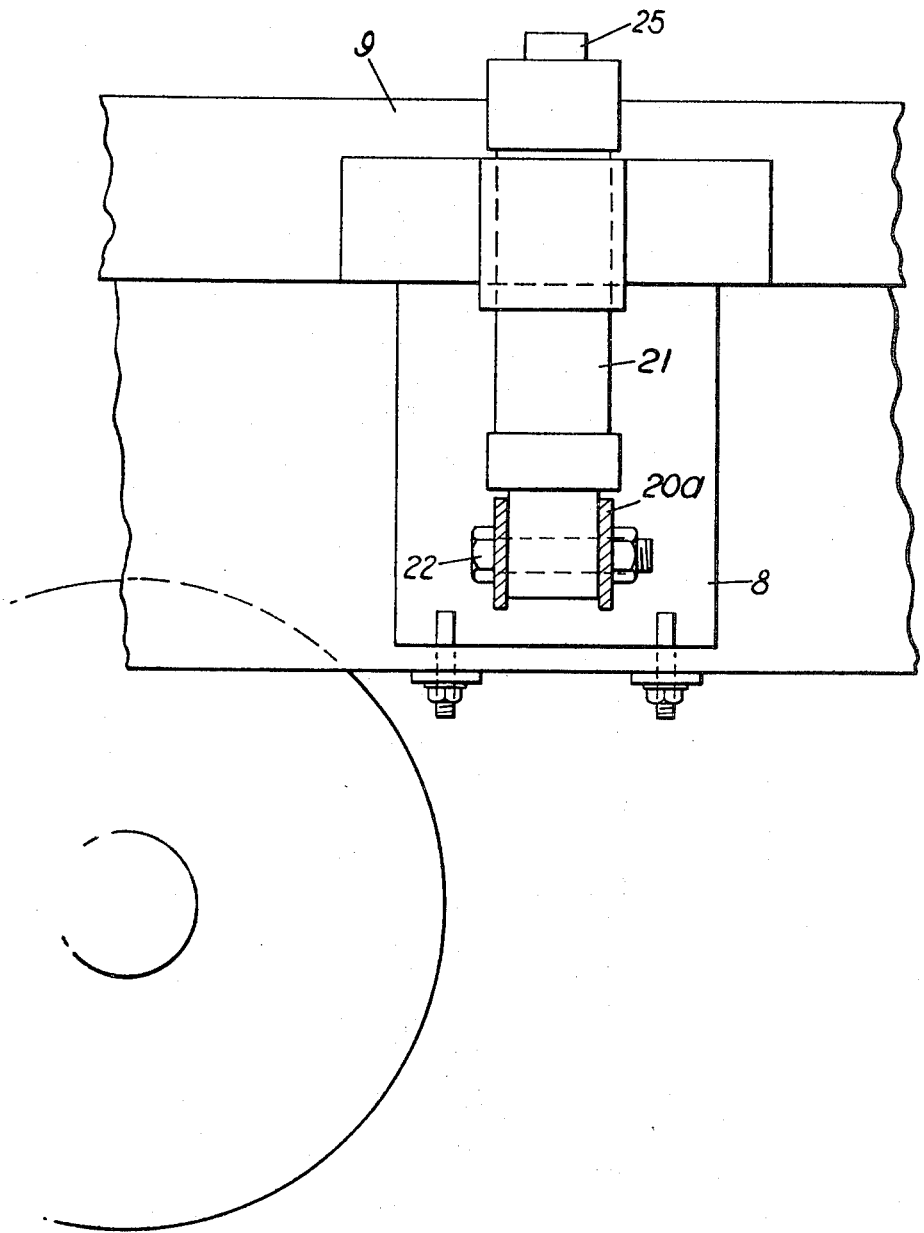
FIG. 4 is a side view of the right half of FIG. 3 looking from the point B.
Figure 5:
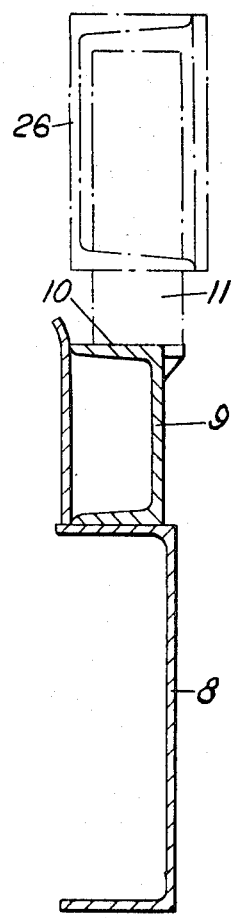
FIG. 5 is a cross-section on the line V—V of FIG. 2 looking in the direction of the arrows, of the body chassis member.

Referring to the drawings, FIG. 1 shows a vehicle having a chassis 1 with front and rear road wheels assemblies 2, 3 and the usual spring means 3' between the chassis and rear wheels 3, with a demountable body 4 standing on front legs 5 and rear legs 6, which when the body is mounted on the vehicle can be retracted. The construction of the legs can be of any conventional form such as hinging upwardly about pivots 7 and they are disposed so as not to foul the vehicle chassis when it is driven between them.

The vehicle chassis has spaced longitudinal chassis members 8 (FIGS. 2 to 5) of channel section. Secured to these chassis members are rails 9 also of channel section the upper surfaces 10 of which form tracks along which bearing elements, shown as wheels 11, on the frame of the body 4 may roll. The forward ends 12 of the upper surfaces 10 of the rails are downwardly inclined and have upstanding slotted lugs 13 for the purpose to be described.

The upper surfaces 15 of the rear ends of the rails 9 are also downwardly inclined and between the contiguous inner faces of the rails is a rearwardly downwardly inclined ramp 16 in the form of a plate having a diverging centrally disposed slot i.e., a V-slot 17 to receive and centre a spigot or cam element 18, like a fifth wheel coupling kingpin, on the underside of the rear of the body. The front legs 5 of the body are of a height which, when the body is standing on the legs, disposes the wheels 11 below the top surfaces 10 of the rails but above the lower rear ends of the inclined rail surfaces 15.

Towards the rear of the chassis, behind the rear wheels and axle 20, a transon 20a is secured between the two members 8 (FIGS. 3 and 4) and at each side a jack 21 is mounted on the transom by a bolt 22 and secured to plates 23 welded or otherwise secured to plates 24 fixed to the members 8 and rails 9. These jacks are hydraulically operated and are preferably double acting so that they are power driven to raise and lower their jacking elements 25. They may be single acting jacks which are raised by the pressure fluid acting on pistons sliding in the cylinders shown and, by releasing the pressure in a controlled manner, the elevated jack pistons move downwardly under gravity and under the weight of the parts acting downwardly on them.

On the longitudinal chassis members 26 of the body are fixed brackets 27 which, when the body is mounted fully over the chassis, they will be disposed above the jacking elements 25.

The jacks are supplied from a pump unit 27a slung between the chassis members 8 which comprises a pump 28 of conventional construction such as a rotary pump, driven by an electric motor 29 fed with electric current from batteries controlled by a switch 30, the whole forming a compact unit with the jacks and operable by the vehicle driver from beside the rear of the vehicle where he has ample vision of the operation.

To mount the body on the vehicle, with the body standing on its legs, the vehicle is backed by the driver so that the chassis members 8 move between the legs 5. The wheels 11 engage the rail surfaces 15 as they move rearwardly so that the front of the legs 5 are lifted off the ground. As the operation continues the wheels 11 roll on the tops of the rails until the chassis members pass between the legs 6 when the wheels 11 run down the inclined rail surfaces 12 until a bar 31 on the front of the body enters the slots in the lugs 13, the lugs serving to locate the body on the vehicle 8 preventing the front of the body bouncing upwardly during travelling. At the same time as the wheels 11 run down the surfaces 12, the spigot 18 on the back of the body enters the slot 17 and is centered at the forward end of the slot. The legs 6 are still in contact with the ground.

The driver then dismounts from the driving seat and goes to the switch 30 which he operates causing the pump 28 to force fluid under pressure into both jack cylinders which thus raises the elements 25 of the jacks until they engage the body brackets 27 and raise the back of the body so that the legs 6 rise off the ground. The legs 6 are then moved to the retracted position, the jacks are driven or freed to act under gravity and the weight of the body to lower the elements 25 until the body chassis members 26 rest on the top of the rails 9. A locking bolt or bolts for example on the lugs 13 are then operated to fix the body to the vehicle so that it cannot run backwardly thereon. The body demounting operation is carried out in the reverse manner.

In analternative construction the rails are wide enough to extend as cantievers over the jacks which may then lift the rear of the rails raising the back of the body with them.

While the jacks are described as hydraulic they may be of any other known construction, such as worm and pinion driven from the vehicle prime mover.

It will thus be seen that the mounting and demounting of the body on the vehicle can be quickly carried out by one man in a short period of time, e.g. 3 minutes, and the chassis members 10 remain at constant height during the whole operation.

I claim:

1. A load carrying vehicle including a chassis having longitudinal members and adapted to receive thereon a demountable body having legs disposable to support it above the ground and having means constructed to move over said longitudinal members on the chassis, said vehicle chassis comprising a frame including said longitudinal members supported on front and rear road wheel assemblies with spring means interposed between said rear road wheel assemblies and said frame, a pair of laterally spaced longitudinal rails secured to said longitudinal chassis members, said rails having surfaces forming running surfaces for forward roller members on such body, body centering means at the rear of said chassis frame, a transom at the rear portion of said chassis and extended between and connected to said chassis members, a pair of double acting fluid operated jacks mounted by brackets one at each side of the vehicle chassis and secured to said transom independent of said spring means, and control means for operating said jacks and including a pump and motor mounted on said transom, whereby when said vehicle has been reversed under said body supported on said legs, said jacks can be operated to cause said jacks to engage the rear portion of said body and raise it off its rear legs without unloading said springs.

2 A load carrying vehicle according to claim 1, wherein said jacks engage cantlever brackets secured to said demountable body.

3. A load carrying vehicle according to claim 1, wherein said body centering means comprises a centering element including a rearwardly facing divergent slot symmetrically disposed with respect to the central longitudinal axis of said chassis, said slot being adapted to receive a centrally disposed spigot on the underside of the rear of said body.

* * * * *